Patented May 29, 1951

2,554,913

UNITED STATES PATENT OFFICE 2,554,913

AMMONIUM HYDROXIDE COMPOSITION

Cyril S. Kimball, Yonkers, N. Y., assignor to Foster D. Snell, Inc., a corporation of New York No Drawing. Application February 4, 1948, Serial No. 6,351

3 Claims. (Cl. 252—155)

This invention relates to an aqueous ammonium hydroxide composition.

The composition is particularly useful as a household ammonia and the invention will be illustrated by description in detail in connection with such use.

Household ammonia solutions, in extensive use for cleaning and other purposes, consist essentially of an aqueous solution containing about 8% or so of ammonia calculated as $NH_3$. Usually they contain also a small proportion of a soap, some of which at least is suspended in the solution and constitutes a clouding material. In some of the more popular compositions, the soap is formed by the addition of oleic and stearic acids to diluted aqua ammonia, with the production of the corresponding ammonium soaps. At the time of use, the household ammonia solution is mixed with water, ordinarily in the ratio of about 1 to 2 ounces of the solution to a gallon of water.

Household ammonias invariably have a strong odor of ammonia. This odor is objectionable to the user. Also it is evidence of loss of the active ingredient from the composition.

The present invention provides a composition of decreased odor of ammonia and, therefore, also decreased loss of ammonia from the composition when the container is open. More important, the composition of the invention shows a decreased rate of loss of ammonia from the film into which the household ammonia solution is formed at the time of use, as upon a kitchen utensil or a fabric.

Briefly stated, the invention comprises an aqueous solution of ammonia and a non-fatty and non-cationic surface active agent serving as a foaming agent. In the preferred embodiment, the invention comprises also a suspended opaque dispersed material serving as a clouding agent and a foam strengthening agent.

I have discovered that, when a composition of this kind is agitated or stirred, ammonia gas emerges from the surface and a foam develops. The foam persists on the surface of the solution and serves as a blanket to retain ammonia gas in contact with the surface of the liquid. The result is decreased diffusion of ammonia gas into the air above the ammonia composition. A second result is increase of concentration of ammonia gas directly over the liquid phase, the consequence of this being a decrease in the net amount of ammonia which escapes from the liquid in a given time.

The extent of the effect of the foam so produced, in blanketing the household ammonia solution, is shown by quantitative data obtained with the use of an osmoscope, as described below.

In the osmoscope test, there were used two speciments of the household ammonia. One of these was a standard product representing conventional household ammonia and containing oleic acid in addition to the ammonia. The other specimen was my improved composition of the formula given later herein under Example 1. These specimens separately were diluted in the ratio of 2 ounces to a gallon of water and agitated in a closed 4 cu. ft. space. In this space air was circulated by a fan for 10 minutes, until uniform conditions were obtained in the space above and around the specimens. Then a measured amount of the gas mixture in the space was withdrawn with the osmoscope. The air so withdrawn was diluted by further extension of the osmoscope so as to draw in additional fresh air from space outside the chamber. With each specimen of household ammonia, the dilution in the osmoscope was continued until the concentration reached the threshold of perception of odor. Readings were then made on the osmoscope. The results followed:

| Kind of Household Ammonia | Osmoscope Readings | Air Dilution Calculated |
|---|---|---|
|  |  | Per cent |
| Standard cloudy household ammonia | pO value 2 | 400 |
| My cloudy ammonia | pO value 1 | 100 |

This table shows that four times the dilution of the air-vapor mixture above the standard ammonia is required to give the same threshold of odor of ammonia as is required with my new ammonia composition. This means that approximately four times as much ammonia gas escaped from the conventional formula as from my formula under comparable conditions of testing.

As the ammonia in my composition, I use commercial aqua ammonia of usual grade and concentration. I dilute the aqua ammonia with sufficient water to make the final concentration that which is desired. Actually, the ammonia solution contains the ammonia largely in the form of ammonium hydroxide. In reality what I use is aqueous ammonium hydroxide solution containing the equilibrium proportion of the free ammonia NH₃. Ordinarily I start with the commercial concentrated solution of ammonium hydroxide of density of about 26° Bé. I dilute this with sufficient water to bring the concentration down to around 8.5% of actual NH₃, 8.5% corresponding to about 15° Bé. Other concentrations may be used, however, to fit any requirement of the industry, all the way from 1 to 4% of ammonia up to the commercial concentrated aqua ammonia containing about 26% of actual ammonia.

Synthetic ammonia is preferred to ammonia derived from coal tar because of the absence, in the synthetic ammonia, of foreign odorous substances.

As the foaming agent, I use a non-fatty, non-cationic surface active material that is effective in lowering surface tension and is soluble in cold water in contact with an excess of ammonium hydroxide. These are of the class of synthetic detergents. Examples of them that illustrate the class of compounds that may be used are the following: the sodium salt of an alkyl aryl sulfonate, a representative alkyl being one containing 12 to 18 carbon atoms and a representative aryl being naphthyl; sodium salt of keryl benzene sulfonate; ethylene oxide complex of lower alkyl phenols; sodium dodecyl sulfate; and sodium higher-alkyl sulfonate in which the alkyl group suitably contains 12 to 18 carbon atoms. In place of the sodium salts, the corresponding potassium or other alkali metal salts may be used.

As clouding material, I use a non-fatty water-insoluble opaque finely divided material which gives a stable, opaque dispersion in water and is compatible with ammonia and with the surface active agent of kind described. Examples of such clouding materials that may be used are rubber latex, either the natural or the synthetic rubber latex such as GR-S latex, vinyl chloride-acetate resin dispersion in water, and like dispersions of vinylidene chloride resin. These resins are examples of the well known class of polyvinyl chloride resins. In fineness of division, the clouding material used should be colloidal, that is, contain a substantial proportion at least of non-settling particles.

As to proportions of the added ingredients in my composition, the surface active agent is used in proportion known, for the particular agent selected, to give a strong foaming action in water alone. This proportion is at least 0.5% or so of the weight of the water in the household ammonia. Disadvantages due to coloration and unnecessary expense are encountered when the proportion used is in excess of 5% of the weight of water in the finished household ammonia solution. As a result, I use about 0.5 to 5 parts of the foaming agent to 100 parts of water in the whole composition.

Proportions here and elsewhere herein are expressed as parts by weight unless otherwise specifically stated.

Of the clouding material, I use a proportion sufficient to give the desired opacity of milkiness to the final composition. This is about 0.05 to 0.5 part for 100 parts of water in the whole composition. Larger amounts than 0.5 part are unnecessary and, therefore, uneconomical.

The invention will be further illustrated by description in connection with the following specific examples of the practice of it:

Example 1

A household ammonia solution is made of the following formula:

| Ingredient | Parts by Weight |
|---|---|
| Sodium salt of alkyl aryl sulfonate (25% of active ingredient) | 15.5 |
| GR-S latex, type 3 | 0.17 |
| Aqua ammonia, 26° Bé | 51.0 |
| Water | 100 |

In a standard test for foam height above the composition, my cloudy ammonia solution of the formula given above showed a height of 6.5 cm. By contrast, standard commercial household ammonia, containing oleic acid added to ammonium hydroxide and having the same concentration of ammonia as my composition, gave a foam height of 0 cm.

As to the decreased rate of loss of ammonia from my composition, as compared to the loss from the conventional product, data are given earlier herein in connection with the osmoscope tests.

Example 2

The procedure and formula of Example 1 are employed except that the sodium alkyl aryl sulfonate is replaced, separately and, in turn, by an equal weight of the sodium salt of keryl benzene sulfonate, the ethylene oxide complex of isooctyl phenol or isoamyl phenol, sodium dodecyl sulfonate, and sodium alkyl sulfonate containing 12–18 carbon atoms in the alkyl group.

Example 3

The procedure and formula of Example 1 are followed except that the sodium alkyl sulfonate of Example 1 is replaced by an equal weight of surface active ingredient consisting of a mixture of any two or more of the surface active agents disclosed in Examples 1 and 2.

Compositions made as described not only show decreased odor and rate of loss of ammonia in use, but are also free from the settling and caking that have long been a problem in conventional household ammonia preparations. They are also free from precipitation by hard water.

It will be understood also that it is intended to cover all changes and modifications of the examples of the invention herein chosen for the purpose of illustration which do not constitute departures from the spirit and scope of the invention.

What I claim is:

1. A household ammonia composition comprising an aqueous ammonium hydroxide solution of concentration corresponding to 4 to 26 parts calculated as ammonia for 100 parts of the solution, a sodium alkyl aryl sulfonate serving as a foaming agent, and a rubber latex dispersed in the solution and causing the solution to be opaque, the alkyl group in the said sulfonate containing 12 to 18 carbon atoms.

2. A composition as described in claim 1, the proportion of the sulfonate being 0.5 to 5 parts and the proportion of the latex being 0.05 to 0.5 part for 100 parts of water in the resulting composition.

3. A household ammonia composition consisting essentially of an aqueous ammonium hydroxide solution of concentration corresponding to 4 to 26 parts calculated as ammonia for 100 parts of the solution, a surface active agent dissolved in the said solution, serving as a foaming agent and being a compound selected from the group consisting of sodium salts of alkyl sulfates and sulfonates and alkyl aryl sulfonates in which the alkyl group contains 12 to 18 carbon atoms, and a dispersed clouding agent selected from the group consisting of rubber latex and water dispersions of polyvinyl chloride resins and being present in the proportion of 0.05 to 0.5 part of the clouding agent for 100 parts of water in the resulting composition.

CYRIL S. KIMBALL.

REFERENCES CITED

The following references are of record in the file of this patent:

UNITED STATES PATENTS

| Number | Name | Date |
|---|---|---|
| 1,968,794 | Bertsch | July 31, 1934 |

FOREIGN PATENTS

| Number | Country | Date |
|---|---|---|
| 358,584 | Great Britain | Oct. 12, 1931 |

OTHER REFERENCES

Washing, Cleaning and Polishing Materials, Bureau of Standards Circular C424 (1939), pages 22 and 23.

Nacconol NR—Booklet of Allied Chem. and Dye Corp., N. Y. (1943), pages 7 and 39.

Aerosol Wetting Agents—Booklet of Amer. Cyanamid and Chem. Corp., N. Y. (1941), pages 3 and 39.